US006287998B1

United States Patent
Seto et al.

(10) Patent No.: US 6,287,998 B1
(45) Date of Patent: Sep. 11, 2001

(54) ULTRAVIOLET/INFRARED ABSORBENT LOW TRANSMITTANCE GLASS

(75) Inventors: Hiromitsu Seto; Yukihito Nagashima; Shigekazu Yoshii, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/452,812

(22) Filed: Dec. 2, 1999

(30) Foreign Application Priority Data

Jan. 12, 1999 (JP) .................................... H11-005699

(51) Int. Cl.⁷ ........................... C03C 3/087; C03C 4/08
(52) U.S. Cl. ................................ 501/71; 501/905
(58) Field of Search ........................ 501/71, 905

(56) References Cited

U.S. PATENT DOCUMENTS

| 5,308,805 | * | 5/1994 | Baker et al. | 501/71 |
| 5,650,365 | * | 7/1997 | Higby et al. | 501/71 |
| 5,952,255 | * | 9/1999 | Seto et al. | 501/71 |
| 5,998,316 | * | 12/1999 | Seto et al. | 501/71 |

FOREIGN PATENT DOCUMENTS

| 5-58670 | 3/1993 | (JP) . |
| 7-508971 | 10/1995 | (JP) . |
| 8-67526 | 3/1996 | (JP) . |
| 8-157232 | 6/1996 | (JP) . |
| 9-169541 | 6/1997 | (JP) . |

* cited by examiner

Primary Examiner—Karl Group
(74) Attorney, Agent, or Firm—Kanesaka & Takeuchi

(57) ABSTRACT

An ultraviolet/infrared absorbent low transmittance glass is formed of a base glass and colorants. The base glass contains 65 to 80 wt. % $SiO_2$; 0 to 5 wt. % $Al_2O_3$; 0 to 10 wt. % MgO; 5 to 15 wt. % CaO wherein a total amount of MgO and CaO is between 5 and 15 wt. %; 10 to 18 wt. % $Na_2O$; 0 to 5 wt. % $K_2O$ wherein a total amount of $Na_2O$ and $K_2O$ is in a range of 10 and 20 wt. %; and 0 to 5 wt. % $B_2O_3$. The colorants contains more than 1.2 wt. % and not more than 1.5 wt. % total iron oxide (T-$Fe_2O_3$) expressed as $Fe_2O_3$; equal to or more than 0.003 wt. % and less than 0.015 wt. % CoO; 0.0009 to 0.005 wt. % Se; 0.0005 to 0.05 wt. % NiO; and 0 to 0.2 wt. % of $TiO_2$, wherein FeO expressed as $Fe_2O_3$ is between 15 and 50 wt. % of T-$Fe_2O_3$. The ultraviolet/infrared absorbent low transmittance glass has a bronze or gray color shade, low visible light transmittance, low solar energy transmittance and low ultraviolet transmittance, so that it is useful for a privacy protecting glass in a rear window of a vehicle.

11 Claims, No Drawings

ULTRAVIOLET/INFRARED ABSORBENT LOW TRANSMITTANCE GLASS

BACKGROUND OF THE INVENTION AND RELATED ART STATEMENT

The present invention relates to an ultraviolet/infrared absorbent low transmittance glass. Particularly, it relates to an ultraviolet/infrared absorbent low transmittance glass which has low visible light transmittance, low solar energy transmittance and low ultraviolet transmittance, and which has a bronze or gray color shade so that it is useful for a window of a vehicle and a building, especially for a privacy protecting glass in a rear window of a vehicle.

Recently, a variety of glasses having ultraviolet and infrared absorptivity to be used as a vehicle windshield has been proposed with the view of preventing color degradation of interior materials and reducing cooling load of the vehicle. Such kinds of glasses include an ultraviolet/infrared absorbent glass having a bronze or gray color shade as the followings.

For example, a window glass of a vehicle disclosed in Japanese Patent Publication No. H5-58670A which is superior in the ultraviolet and infrared absorptivity consists of soda-lime-silica glass including cerium oxide of 0.1 to 1 wt. %, iron oxide expressed as $Fe_2O_3$ of 0.2 to 0.6 wt. %, CoO of 0 to 0.005 wt. %, NiO of 0 to 0.01 wt. % and Se of 0.0005 to 0.005 wt. %.

An ultraviolet/infrared absorbent glass having a bronze color shade disclosed in Japanese Patent Publication No. H9-169541A consists of soda-lime-silica glass including total iron oxide expressed as $Fe_2O_3$ (T-$Fe_2O_3$) of 0.25 to 0.45 wt. %, $CeO_2$ of 0.8 to 2.0 wt. %, $TiO_2$ of 0 to 1.0 wt. %, CoO of 0 to 0.005 wt. %, Se of 0.0005 to 0.005 wt. % and FeO expressed as $Fe_2O_3$ of 15.5 to 25.0 wt. % of T-$Fe_2O_3$.

A privacy protecting glass having low visible light transmittance is often preferred for use particularly in a rear window of a vehicle. Such kinds of glasses are given as the followings.

A neutral dark gray colored glass disclosed in claim 25 of U.S. Pat. No. 5,393,593 consists of soda-lime-silica glass including colorants consisting of 1.00 to 2.2 wt. % $Fe_2O_3$ (total iron), at least 0.20 wt. % FeO, 0.0005 to 0.005 wt. % Se, and 0.010 to 0.030 wt. % CoO. The glass exhibits a luminous transmittance of equal to or less than 35% and a total solar infrared transmittance of equal to or less than 20% at a thickness of 3.9 mm.

A dark gray colored glass disclosed in Japanese Patent Publication No. H8-157232A consists of soda-lime-silica glass including colorants consisting of 0.8 to 1.4 wt. % $Fe_2O_3$ (total iron), equal to or less than 0.21 wt. % FeO, 0.05 to 1.0 wt. % $TiO_2$, 0.02 to 0.05 wt. % CoO, and 0.0005 to 0.015 wt. % Se.

A gray colored glass disclosed in Japanese Patent Publication No. H8-67526A consists of soda-lime-silica glass including colorants consisting of 0.15 to 1.2 wt. % $Fe_2O_3$ (total iron), equal to or less than 0.30 wt. % FeO, 60 to 180 ppm CoO, 0 to 30 ppm Se, and 0 to 550 ppm NiO. The glass having a thickness of 3.9 mm exhibits the visual appreciation transmittance of 20 to 50%.

A neutral colored soda-lime-silica glass compound disclosed in PCT Application of Japanese Translated Publication No. H7-508971A consists of about 1.3 to about 2 wt. % $Fe_2O_3$ (total iron), about 0.01 to about 0.05 wt. % NiO, about 0.02 to about 0.04 wt. % $CO_3O_4$, about 0.0002 to about 0.003 wt. % Se wherein a rate of ferrous iron is 18 to 30% and a light and shade coefficient is equal to or less than 0.53.

The window glass of a vehicle disclosed in Japanese Patent Publication No. H5-58670A and the ultraviolet/infrared absorbent glass disclosed in Japanese Patent Publication No. H9-169541A have high transmittance so that the glasses can not be provided with the property of privacy protection equivalent to the present invention. The glasses have a disadvantage of being inferior especially in the infrared absorptivity because of their short content of the total iron.

The neutral dark gray colored glass disclosed in U.S. Pat. No. 5,393,593 contains a large amount of the total iron oxide and is substantially free of nickel. In such glasses containing a large amount of the total iron oxide, the absorption range of the iron ion varies during the reinforcement with air blast cooling, so that the glasses are tinged with yellow. Such discoloration is not preferable for the low transmittance glass having a bronze or gray color shade.

The dark gray colored glass disclosed in Japanese Patent Publication No. H8-157232A which includes $TiO_2$ as an essential component in the range of 0.05 to 1.0 wt. % is not preferable because $TiO_2$ is expensive to increase the batch cost and the glass is tinged with yellow to be worsened in the appearance as though it is attached with tar on its surface.

The gray colored glass compound disclosed in Japanese Patent Publication No. H8-67526A is short of the total iron, especially of FeO which contributes to absorption of the heat rays, so that the glass is not preferable because the glass can not be provided with enough heat rays absorptivity under the moderate redox condition. When the amount of the total iron is insufficient, even though it is possible to increase the amount of FeO due to radical reducing fusion, such reducing fusion is not preferable because it may cause obstacles including effusion of streaks with enough silica and silica scum to production in a conventional glass melting furnace.

The neutral colored soda-lime-silica glass compound disclosed in the PCT Application of Japanese Translated Publication No. H7-508971A has a neutral gray color tone, which is precisely a so-called greenish gray color tone having the chromaticity fixed at a*-coordinate of around 4 and b*-coordinate of around 3 on the chromaticity coordinates. The glass has a disadvantage externally in that the interior furnishings are tinged with green and seem to discolor when seen through the glass as compared with a glass having a neutral gray color tone.

OBJECT AND SUMMARY OF THE INVENTION

It is an object of the present invention to solve the aforementioned conventional problems and to provide an ultraviolet/infrared absorbent low transmittance glass which has a bronze or gray color shade and which has low visible light transmittance, low solar energy transmittance and low ultraviolet transmittance so that the glass is useful for a window glass of a vehicle and a building, especially for a privacy protecting glass in a rear window of a vehicle.

In the conventional art, nickel has been considered to be unsuitable for use since nickel causes discoloration during the reinforcement process. The present invention makes use of the discoloration during the reinforcement process positively so as to obtain a desirable deep bronze or gray color shade after the reinforcement.

An ultraviolet/infrared absorbent low transmittance glass of the present invention consists of a base glass and colorants, said base glass comprising:

65 to 80 wt. % $SiO_2$;

0 to 5 wt. % $Al_2O_3$;

0 to 10 wt. % MgO;

5 to 15 wt. % CaO wherein a total amount of MgO and CaO is between 5 and 15 wt. %;

10 to 18 wt. % $Na_2O$;

0 to 5 wt. % $K_2O$ wherein a total amount of $Na_2O$ and $K_2O$ is between 10 and 20 wt. %; and 0 to 5 wt. % $B_2O_3$, and said colorants including:

more than 1.2 wt. % and not more than 1.5 wt. % total iron oxide (T-$Fe_2O_3$) expressed as $Fe_2O_3$;

equal to or more than 0.003 wt. % and less than 0.015 wt. % CoO;

0.0009 to 0.005 wt. % Se; and 0.0005 to 0.05 wt. % NiO, wherein FeO expressed as $Fe_2O_3$ is between 15 and 50 wt. % of T-$Fe_2O_3$.

DETAILED DESCRIPTION OF PREFERRED EMBODIMENTS

The description will be made as regard to an ultraviolet/infrared absorbent low transmittance glass composition. It should be noted that components will be represented with percentage by weight.

$SiO_2$ is a principal component for forming skeleton of glass. Less than 65% $SiO_2$ lowers the durability of the glass and more than 80% $SiO_2$ raises the melting temperature of the glass so high.

$Al_2O_3$ is a component for improving the durability of the glass. More than 5% $Al_2O_3$ raises the melting temperature of the glass so high. $Al_2O_3$ is preferable to be comprised within a range of 0.1 to 2%.

MgO and CaO improve the durability of the glass and adjust a liquidus temperature and viscosity of the glass during forming. More than 10% MgO raises the liquidus temperature. Less than 5% or more than 15% CaO raises the liquidus temperature of the glass. The durability of the glass is lowered when the total amount of MgO and CaO is less than 5%, while the liquidus temperature rises when the total exceeds 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 18% or the total of $Na_2O$ and $K_2O$ exceeds 20%. $K_2O$ is preferable not to exceed 5% because of its expensive cost.

$B_2O_3$ is a component for improving the durability of the glass, prompting to melt, and yet enhancing the ultraviolet absorption. $B_2O_3$ should be less than 5%, since difficulties during forming are caused due to the vaporization of $B_2O_3$ when $B_2O_3$ exceeds 5%.

Iron oxide is present both in the form of $Fe_2O_3$, and the form of FeO in the glass. $Fe_2O_3$ is a component for improving the ultraviolet absorptivity and FeO is a component for improving the heat rays absorptivity.

When the total amount of iron oxide expressed as $Fe_2O_3$ (T-$Fe_2O_3$) is equal to or less than 1.2%, the efficiency of ultraviolet and infrared absorptivity becomes small so as not to provide desired optical properties. On the other hand, T-$Fe_2O_3$ more than 1.5% is not preferable since the temperature around a crown of a glass melting furnace may exceed its refractory temperature due to absorption of the heat rays by the ferrous oxide and, in addition, long time is required to change a composition to different glass materials in case of continuous production in a glass melting furnace.

Particularly, it is preferable that T-$Fe_2O_3$ of more than 1.2% and less than 1.3% is contained since the ultraviolet and infrared absorptivity and the efficiency of the continuous production are increased at the same time.

$Fe_2O_3$ has a function of increasing the absorptivity particularly in ultraviolet range when glass is reinforced by air blast cooling. This exhibits that the glass of the present invention can obtain enough efficiency of ultraviolet absorptivity without using the expensive ultraviolet absorbents including $CeO_2$ and $TiO_2$.

When FeO/T-$Fe_2O_3$ weight ratio (the ratio of the weight of FeO expressed as $Fe_2O_3$ against T-$Fe_2O_3$) is too low, the heat rays absorptivity can not be obtained sufficiently because of a small amount of FeO, and many bubbles are also formed in the molten glass because the molten glass is relatively oxidative so that the product yield is lowered. Conversely, when FeO/T-$Fe_2O_3$ weight ratio is too high, the visible light transmittance is reduced so that the glass is tinged with blue, and defects including nickel sulfide stones, streaks with enough silica and silica scum may be additionally caused.

In the present invention, the weight ratio of FeO/T-$Fe_2O_3$ is taken in a range between 15 and 50% so that the bronze or gray colored glass having high ultraviolet transmittance and high heat rays absorptivity can be obtained stably. Particularly, the weight ratio of FeO/T-$Fe_2O_3$ is preferable to be taken in a range between 15 and 28%.

CoO is a component for forming the bronze or gray color shade by cooperating with Se, NiO, and $Fe_2O_3$ and also for controlling the visible light transmittance. Less than 0.003% CoO can not form a desired color shade and makes the visible light transmittance too high. More than 0.02% CoO makes the color too blue and reduces the visible light transmittance.

In the present invention, Se and NiO are contained as essential components for controlling the visible light transmittance and for providing a property of privacy protection due to cooperating with CoO so as to obtain the preferable bronze or gray color shade.

Less than 0.0009% Se can not form the desired color shade, and more than 0.005% Se reduces the visible light transmittance. It is preferable to contain Se in a range of between 0.0009% and 0.003%.

NiO has an absorptivity in an infrared range, so that it is a component for reducing the solar energy transmittance like as FeO. Less then 0.0005% NiO can not form the desired color shade, and more than 0.05% NiO reduces the visible light transmittance. NiO is preferable to be contained in a range between 0.0005% and 0.02%. It is known that NiO is varied in the color development when the glass is reinforced with air blast cooling. The present invention makes use of the discoloration during the reinforcement so as to develop the desired color shade.

In the present invention, colorants including $CeO_2$, $TiO_2$, $V_2O_5$ and the like may be added as supplements to the ultraviolet absorbents in such ranges as not to lose the desired color shade. $CeO_2$, $TiO_2$ or $V_2O_5$ is a component for improving the ultraviolet absorptivity by itself or by interaction with another ion and may be added in such a range not to lose the bronze or gray color shade. $CeO_2$ is preferable to be added not more than 2% since $CeO_2$ has the relatively small influence on the color tone. While $TiO_2$, $V_2O_5$ is preferable to be added not more than 0.5%.

One or more than two among MnO, $MoO_3$, CuO, $Cr_2O_3$, and the like as colorant and $SnO_2$ as a reducing agent or a co-clarifier may be added in a range of 0 to 1% in total in such a range as not to lose the desired visible light transmittance and shade. To further securely prevent the formation of nickel sulfide stones, the zinc compound including ZnO may be added in a range from 0 to 1%.

In the present invention, the glass is preferable to be reinforced by the air blast cooling. The desired color shade and optical properties can be obtained by making use of variation in the color of the glass caused due to containing NiO and $Fe_2O_3$ in the glass during the reinforcement process.

In the reinforcement process, the glass plate produced from the molten glass is reheated at 600 to 750° C. for 2 to 5 minutes, and then, cooled by blasting air of 10 to 30° C. at a cooling rate of 100 to 300° C./sec.

The ultraviolet/infrared absorbent low transmittance glass of the present invention having a thickness of 4 mm formed as mentioned above has the visible light transmittance (Ya) in a range of 10 to 60% when measured by using the CIE illuminant A, the solar energy transmittance (Tg) of equal to or less than 40% and the ultraviolet transmittance (Tuv) specified by ISO of equal to or less than 10%.

The glass has the chromaticity expressed as a* and b* defined by the L*a*b* coordinates in ranges of $-4 \leq a^* \leq 2$ and $-4 \leq b^* \leq 20$ when measured by using CIE illuminant C so that the glass has the bronze or gray color shade.

A privacy protecting glass for a rear window of a vehicle is preferable to have a bronze color shade so as to make the color of the interior furnishings warmer when seen through the window or a gray color shade so as to give the luxury to the vehicle. When the glass has the bronze color shade, the chromaticity expressed as a* and b* mentioned above is preferable to be in ranges of $-2 \leq a^* \leq 2$ and $0 \leq b^* \leq 15$. When the glass has the gray color shade, the absolute value of a* (|a*|) subtracted with that of b* (|b*|) is preferable to be in a range of $-2 \leq |a^*|-|b^*| \leq 2$.

Hereinafter, preferable embodiments of the present invention will be described referring to Examples and Comparative Examples.

EXAMPLES 1 THROUGH 11

Glass raw material is prepared by adding required composition consisting of ferric oxide, titanium oxide, cerium oxide, cobalt oxide, metallic selenium, and nickel oxide into a standard soda-lime-silica glass batch composition, also adding carbonaceous reducing agent (concretely, coke powder etc.) at a ratio of about 0.01 parts by weight per 100 parts of the glass raw material therein, and mixing them. The glass raw material thus prepared is heated and melted in an electric furnace at 1500° C. for 4 hours. The molten glass is flowed onto a stainless plate and annealed to the room temperature to obtain glass plates having a thickness of about 6 mm. The glass plates are polished to reduce the thickness to 4 mm. The glass plates are, then, reinforced with reheating it at 700° C. for 5 minutes and then cooling it with air blast having a temperature of about 20° C. at 2 to 3 kgf/mm² wind pressure and 0.7 to 0.6 Nm³/min. wind flow to become a sample. Each sample is measured in the visible light transmittance (YA) by using the CIE illuminant A, the solar energy transmittance (TG), the ultraviolet transmittance specified by ISO 9050 (Tuv), the dominant wavelength (λd) by using the CIE illuminant C, and the excitation purity (Pe). L*, a* and b* defined by CIE color coordinates are also measured by using CIE illuminant C.

Table 1 shows base glass compositions of the obtained samples, T-$Fe_2O_3$ concentration, FeO (expressed as $Fe_2O_3$) concentration, FeO (expressed as $Fe_2O_3$)/T-$Fe_2O_3$ rate, CoO concentration, Se concentration, NiO concentration, $CeO_2$ concentration, and $TiO_2$ concentration. The values in Table 1 are indicated as a percentage of the weight. About 0.03 wt. % $TiO_2$ is introduced in the form of impurity contained in the stocks including the silica sand even when $TiO_2$ is not added intentionally. The values of $SiO_2$ concentration are rounded with the fractions of 0.5 and over as a unit and cut away the rest. Table 1 also shows the optical properties of the respective reinforced samples.

TABLE 1

| Examples | 1 | 2 | 3 | 4 | 5 | 6 |
|---|---|---|---|---|---|---|
| $SiO_2$ | 71 | 71 | 71 | 71 | 71 | 71 |
| $Al_2O_3$ | 1.59 | 1.59 | 1.59 | 1.59 | 1.59 | 1.59 |
| MgO | 3.65 | 3.65 | 3.65 | 3.65 | 3.65 | 3.65 |
| CaO | 7.68 | 7.68 | 7.68 | 7.68 | 7.68 | 7.68 |
| $Na_2O$ | 13.7 | 13.7 | 13.7 | 13.7 | 13.7 | 13.7 |
| $K_2O$ | 0.9 | 0.9 | 0.9 | 0.9 | 0.9 | 0.9 |
| $B_2O_3$ | — | 0.5 | — | — | — | — |
| T-$Fe_2O_3$ | 1.400 | 1.220 | 1.310 | 1.255 | 1.260 | 1.260 |
| FeO | 0.389 | 0.338 | 0.367 | 0.196 | 0.233 | 0.282 |
| FeO/T-$Fe_2O_3$ (%) | 27.8 | 27.7 | 28.0 | 15.7 | 18.5 | 22.4 |
| NiO | 0.0005 | 0.0005 | 0.035 | 0.015 | 0.01 | 0.01 |
| Se | 0.001 | 0.0033 | 0.0011 | 0.002 | 0.0018 | 0.0018 |
| CoO | 0.004 | 0.0195 | 0.01 | 0.015 | 0.012 | 0.012 |
| $TiO_2$ | 0.03 | 0.03 | 0.03 | 0.20 | 0.03 | 0.03 |
| $CoO_2$ | — | — | — | 1.20 | — | — |
| other | | | | | | |
| YA (%) | 32.1 | 11.2 | 22.0 | 24.8 | 26.2 | 26.2 |
| TG (%) | 18.2 | 13.1 | 14.7 | 27.3 | 24.3 | 21.6 |
| Tuv (ISO) (%) | 2.15 | 0.55 | 3.30 | 3.29 | 2.32 | 2.64 |
| λ d | 573.5 | 583.4 | 573.4 | 491.5 | 578.4 | 575.6 |
| Pe (%) | 21.89 | 36.81 | 23.48 | 3.06 | 19.36 | 15.56 |
| L* | 62.85 | 38.35 | 53.48 | 57.25 | 57.41 | 57.73 |
| a* | −3.81 | 6.61 | −3.45 | −2.98 | 0.90 | −1.08 |
| b* | 15.43 | 15.43 | 15.46 | 0.33 | 12.77 | 10.61 |

TABLE 1-continued

| Examples | 7 | 8 | 9 | 10 | 11 |
|---|---|---|---|---|---|
| $SiO_2$ | 71 | 71 | 71 | 71 | 71 |
| $Al_2O_3$ | 1.59 | 1.59 | 1.59 | 1.59 | 1.59 |
| MgO | 3.65 | 3.65 | 3.65 | 3.65 | 3.65 |
| CaO | 7.68 | 7.68 | 7.68 | 7.68 | 7.68 |
| $Na_2O$ | 13.7 | 13.7 | 13.7 | 13.7 | 13.7 |
| $K_2O$ | 0.9 | 0.9 | 0.9 | 0.9 | 0.9 |
| $B_2O_3$ | — | — | — | — | 0.1 |
| $T\text{-}Fe_2O_3$ | 1.210 | 1.260 | 1.255 | 1.255 | 1.255 |
| FeO | 0.234 | 0.249 | 0.198 | 0.252 | 0.235 |
| $FeO/T\text{-}Fe_2O_3$ (%) | 19.3 | 19.8 | 15.7 | 20.1 | 18.8 |
| NiO | 0.001 | 0.01 | 0.015 | 0.01 | 0.015 |
| Se | 0.0015 | 0.0019 | 0.0015 | 0.0015 | 0.002 |
| CoO | 0.008 | 0.019 | 0.015 | 0.015 | 0.015 |
| $TiO_2$ | 0.03 | 0.03 | 0.03 | 0.03 | 0.03 |
| $CoO_2$ | — | — | — | — | — |
| other | | $MnO_2$: 0.7% | | | |
| YA (%) | 34.3 | 17.8 | 28.8 | 28.5 | 25.1 |
| TG (%) | 27.8 | 20.1 | 28.5 | 25.0 | 24.7 |
| Tuv (ISO) (%) | 3.77 | 2.48 | 3.35 | 3.77 | 4.04 |
| λ d | 577.9 | 577.0 | 567.0 | 546.0 | 487.3 |
| Pe (%) | 18.67 | 10.36 | 5.38 | 2.51 | 5.92 |
| L* | 64.40 | 48.82 | 60.57 | 60.01 | 57.69 |
| a* | 0.49 | −0.12 | −2.58 | −3.63 | −3.69 |
| b* | 13.58 | 6.14 | 4.24 | 1.67 | −2.80 |

The compositions of Examples 1 through 11 are within the scope of claim 5 defining the preferable range of FeO. Examples 1 through 11 are also within the scope of claim 6 so that the glass having a thickness of 4 mm is provided with the visible light transmittance (Ya) in the range of 10 to 60% when measured by using the CIE illuminant A, the solar energy transmittance (Tg) of not more than 40% and the ultraviolet transmittance (Tuv) specified by ISO 9050 of not more than 10%. Each sample is decreased in TG below 30% and improved in the ultraviolet absorptivity.

Examples 1 and 3 through 11 are within the scope of claim 2 defining the preferable range. Example 2 is not preferable in view of color tone since the Example 2 is deeply tinged with red because of its large content of Se.

The compositions of Examples 1, 2 and 4 through 11 are within the scope of claim 3 defining the preferable range. These Examples have preferable bronze or gray color shades due to including Se, CoO and NiO in the good proportions.

The compositions of Examples 1 and 3 through 11 are within the scope of claim 7 defining the preferable range of the chromaticity. These Examples exhibit the low transmittance and the desired bronze or gray color shade simultaneously.

Examples 5 through 8 are within the scope of claim 8 wherein the glasses have the chromaticity expressed as a* and b* in the ranges of −2≦a* ≦2 and 0≦b*≦15 so that the glasses have the bronze color shade.

Examples 9 through 11 are within the scope of claim 9 so that the glasses have the gray color shade.

Example 4 is improved in the properties due to adding $TiO_2$ and $CeO_2$. Example 8 is further improved in the cromaticity due to adding $MnO_2$.

Therefore, when the glass compositions of Examples mentioned above are used for a windshield of a vehicle and a window of a building, good effects of preventing degradation of interior materials and of privacy protection can be obtained.

Comparative Examples 1 Through 4

Table 2 shows glass components and optical properties of Comparative Examples which are made in the same manner as Examples 1 through 11 except for the glass components.

TABLE 2

| Comparative Examples | 1 | 2 | 3 | 4 |
|---|---|---|---|---|
| $SiO_2$ | 72.5 | 71 | 71 | 71 |
| $Al_2O_3$ | 0.12 | 1.59 | 1.59 | 1.59 |
| MgO | 3.8 | 3.65 | 3.65 | 3.65 |
| CaO | 8.8 | 7.68 | 7.68 | 7.68 |
| $Na_2O$ | 13.6 | 13.7 | 13.7 | 13.7 |
| $K_2O$ | — | 0.9 | 0.9 | 0.9 |
| $B_2O_3$ | — | — | — | — |
| $T\text{-}Fe_2O_3$ | 0.45 | 1.26 | 1.60 | 1.26 |
| FeO | 0.128 | 0.278 | 0.544 | 0.278 |
| $FeO/T\text{-}Fe_2O_3$ (%) | 28.4 | 22.1 | 34.0 | 22.1 |
| NiO | — | 0.01 | 0.01 | 0.056 |
| Se | 0.0014 | 0.0018 | 0.016 | 0.016 |
| CoO | 0.0098 | 0.035 | 0.012 | 0.012 |
| $TiO_2$ | — | 0.03 | 0.03 | 0.20 |
| $CeO_2$ | — | — | — | — |
| other | | | | |
| YA (%) | 48.9 | 9.9 | 14.3 | 19.3 |
| TG (%) | 47.3 | 15.0 | 7.5 | 20.0 |
| Tuv (ISO) (%) | 18.74 | 2.40 | 0.73 | 3.16 |
| λ d | 483.1 | 479.7 | 577.0 | 577.3 |
| Pe (%) | 1.27 | 15.08 | 32.71 | 31.56 |
| L* | | 38.32 | 43.71 | 49.96 |
| a* | | −1.43 | −0.37 | 0.00 |
| b* | | −17.96 | 17.95 | 19.05 |

Each of Comparative Examples 1 through 4 has a composition out of the range of the present invention. Comparative Example 1 has the same composition and the same properties as the example of Japanese Patent Publication No. H8-67526A as referred in the prior art description. Comparative Example 4 includes NiO amount of which is out of the range of the present invention, and the properties of the glass exhibit out of the range of the present invention.

It is apparent from Table 2 that Comparative Example 1 has higher visible light transmittance than that of Examples because of its short content of total iron oxide, and the glass is not provided with enough heat rays absorptivity.

Comparative Example 2 includes CoO amount of which is out of the range of the present invention. The glass is not preferable because of being tinged deeply with blue and reduced in the visible light transmittance.

Comparative Example 3 includes T-$Fe_2O_3$ amount of which is out of the range of the present invention. Comparative Example 3 cannot be provided with the desired bronze or gray color shade because the glass is tinged deeply with yellow.

Comparative Example 4 includes NiO amount of which is out of the range of the present invention, and the glass is not preferable because the glass is tinged with yellowish brown.

As detailed above, according to the present invention, an ultraviolet/infrared absorbent low transmittance glass which exhibits low visible light transmittance, low solar energy transmittance, and low ultraviolet transmittance and which has a bronze or gray color shade can be provided.

The ultraviolet/infrared absorbent low transmittance glass of the present invention can exhibit the effect of preventing degradation and discoloration of interior materials and the effect of privacy protection when the glass is used for a rear window glass of a vehicle, a window of a building, or the like. The shade of the glass of the present invention is remarkable in harmony with colors of a body of a vehicle, interior furnishings and exterior walls of a building.

What is claimed is:

1. An ultraviolet/infrared absorbent low transmittance glass consisting of a base glass and colorants, said base glass comprising:

65 to 80 wt. % $SiO_2$;

0 to 5 wt. % $Al_2O_3$;

0 to 10 wt. % MgO;

5 to 15 wt. % CaO wherein a total amount of MgO and CaO is between 5 and 15 wt. %;

10 to 18 wt. % $Na_2O$;

0 to 5 wt. % $K_2O$ wherein a total amount of $Na_2O$ and $K_2O$ is in a range of 10 and 20 wt. %; and 0 to 5 wt. % $B_2O_3$, and said colorants including:

more than 1.2 wt. % and not more than 1.5 wt. % total iron oxide (T-$Fe_2O_3$) expressed as $Fe_2O_3$;

equal to or more than 0.003 wt. % and less than 0.015 wt. % CoO;

0.0009 to 0.005 wt. % Se;

0.0005 to 0.05 wt. % NiO; and 0 to 0.2 wt. % of $TiO_2$, wherein FeO expressed as $Fe_2O_3$ is between 15 and 50 wt. % of T-$Fe_2O_3$.

2. An ultraviolet/infrared absorbent low transmittance glass as claimed in claim 1, wherein Se is 0.0009 to 0.003 wt. %.

3. An ultraviolet/infrared absorbent low transmittance glass as claimed in claim 1, wherein NiO is 0.0005 to 0.02 wt. %.

4. An ultraviolet/infrared absorbent low transmittance glass as claimed in claim 1, wherein T-$Fe_2O_3$ is more than 1.2 wt. % and less than 1.3 wt. %.

5. An ultraviolet/infrared absorbent low transmittance glass as claimed in claim 1, wherein FeO expressed as $Fe_2O_3$ is in a range of 15 to 28 wt. % of T-$Fe_2O_3$.

6. An ultraviolet/infrared absorbent low transmittance glass as claimed in claim 1, wherein said glass having a thickness of 4 mm is provided with a visible light transmittance (YA) in a range of 10 to 60% when measured by using the CIE illuminant A, a solar energy transmittance(TG) of not more than 40% and an ultraviolet transmittance(Tuv) specified by ISO of not more than 10%.

7. An ultraviolet/infrared absorbent low transmittance glass as claimed in claim 1, wherein the glass has a bronze or gray color shade and a chromaticity expressed as a* and b* by using the L*a*b* coordinates in ranges of $-4 \leq a^* \leq 2$ and $-4 \leq b^* \leq 20$ when measured by using the CIE illuminant C.

8. An ultraviolet/infrared absorbent low transmittance glass as claimed in claim 7, wherein the glass has a bronze color shade having said chromaticity expressed as a* and b* in ranges of $-2 \leq a^* \leq 2$ and $0 \leq b^* \leq 15$.

9. An ultraviolet/infrared absorbent low transmittance glass as claimed in claim 7, wherein the glass has a gray color shade having said chromaticity expressed as a* and b* in a range of $-2 \leq |a^*|-|b^*| \leq 2$.

10. An ultraviolet/infrared absorbent low transmittance glass as claimed in claim 1, wherein the glass is reinforced by air blast cooling.

11. An ultraviolet/infrared absorbent low transmittance glass as claimed in claim 1, wherein CoO is 0.003 to 0.012 wt. %.

* * * * *